April 16, 1968  J. M. ROBERTS  3,378,456
JET PUMPING MEANS FOR A NUCLEAR REACTOR
Filed April 5, 1965  4 Sheets-Sheet 1
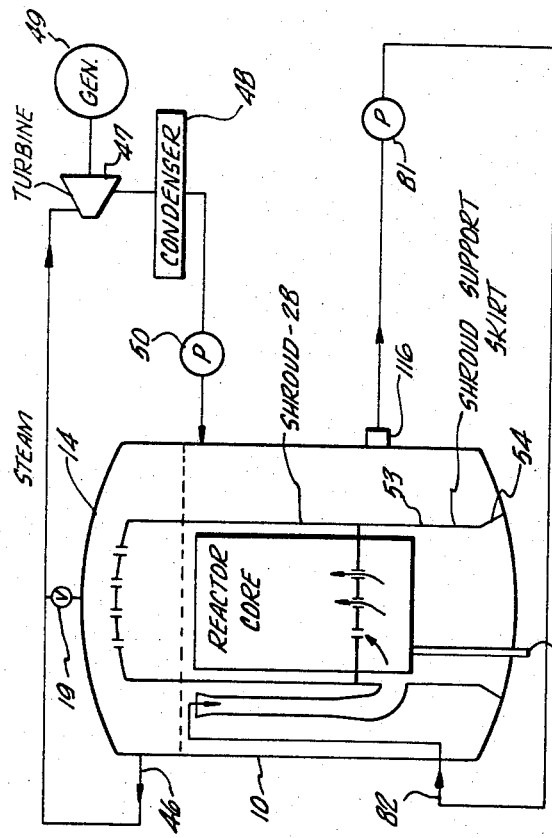
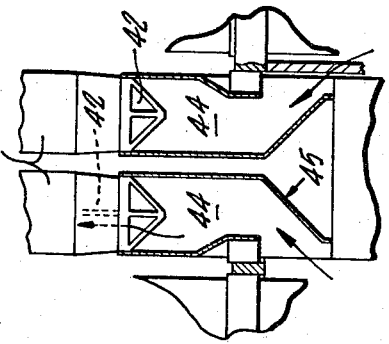
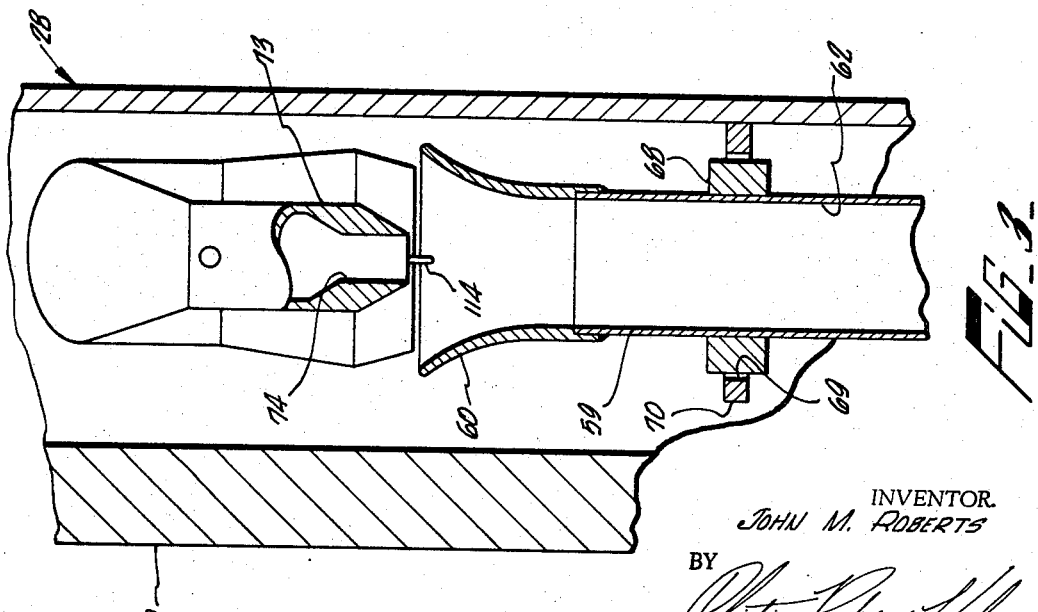
INVENTOR.
JOHN M. ROBERTS
BY
Christie, Parker & Hale
ATTORNEYS.

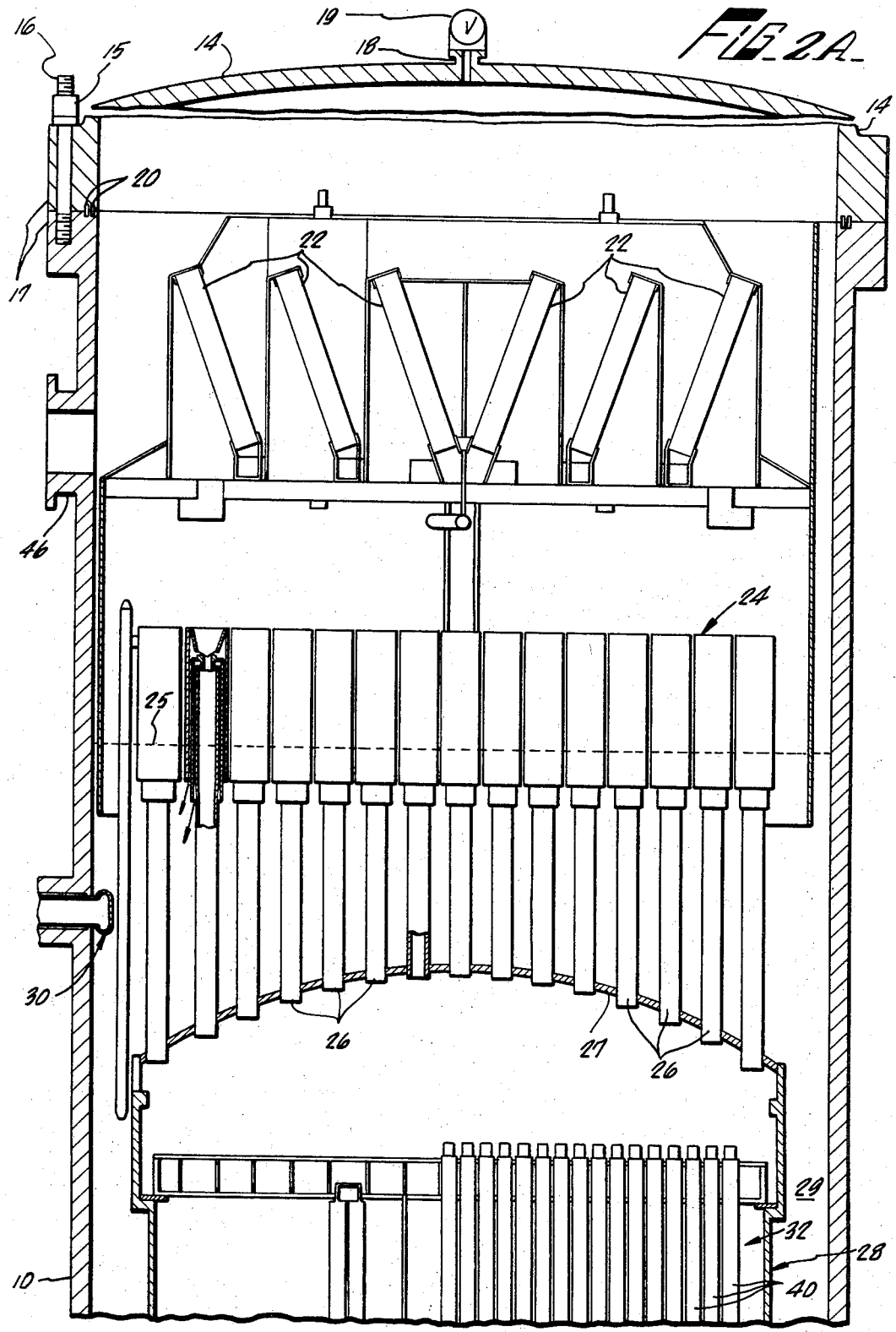

April 16, 1968  J. M. ROBERTS  3,378,456
JET PUMPING MEANS FOR A NUCLEAR REACTOR
Filed April 5, 1965  4 Sheets-Sheet 4
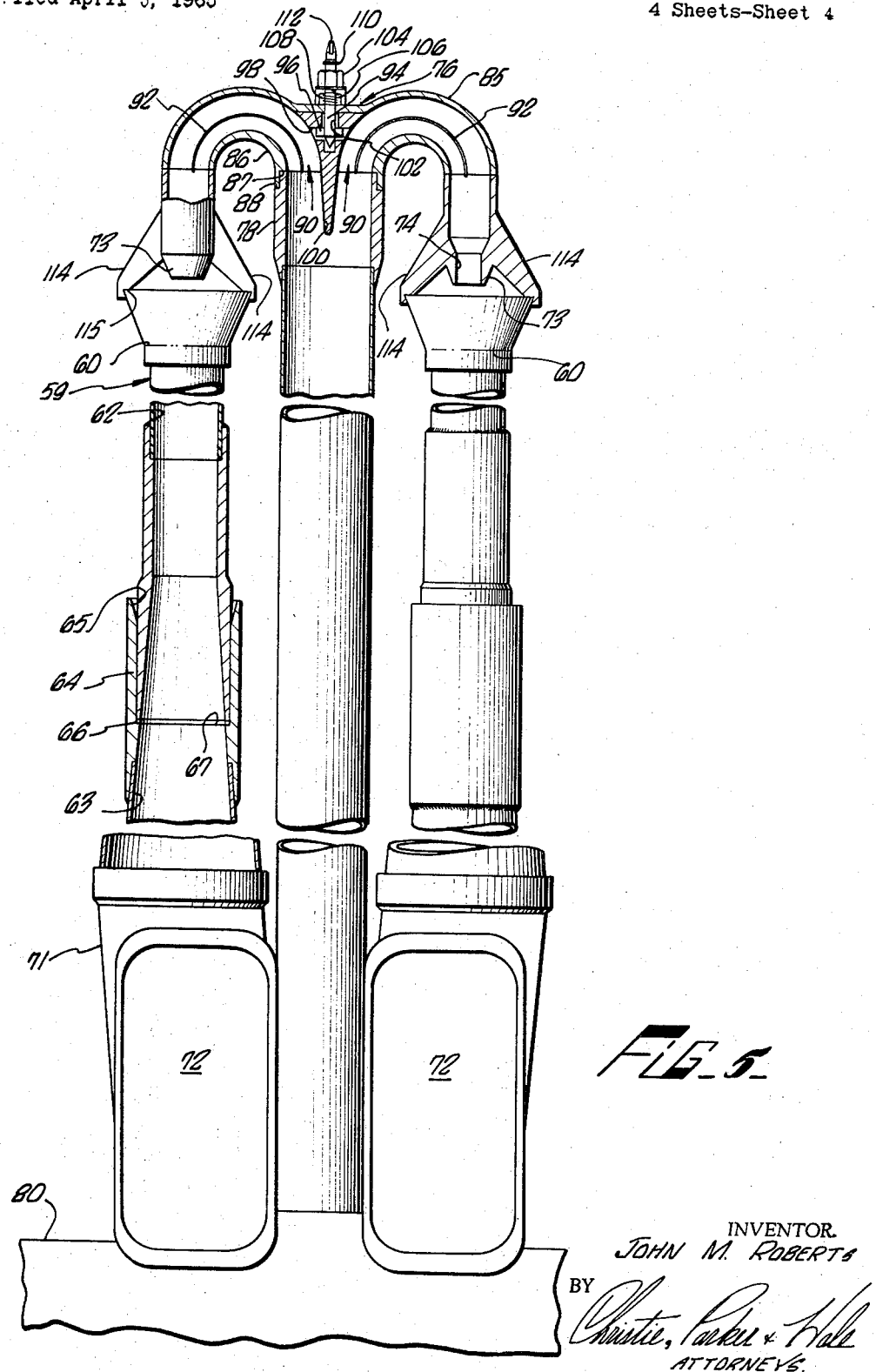
FIG_5
INVENTOR.
JOHN M. ROBERTS
BY
Christie, Parker & Hale
ATTORNEYS.

United States Patent Office 3,378,456
Patented Apr. 16, 1968

3,378,456
JET PUMPING MEANS FOR A
NUCLEAR REACTOR
John M. Roberts, San Jose, Calif., assignor to General
Electric Company, a corporation of New York
Filed Apr. 5, 1965, Ser. No. 445,382
7 Claims. (Cl. 176—61)

ABSTRACT OF THE DISCLOSURE

The invention relates to a system of jet pumps for circulating a cooling fluid such as water through a nuclear reactor core contained within a pressure vessel. The jet pumps are located in a downcomer annulus between a shroud surrounding the core and the interior of the pressure vessel whereby the coolant is forced downward into the inlet end or bottom of the core. The nozzles of the pumps are supplied with driving fluid via a distributor, near the bottom of the vessel, and riser pipes extending upward adjacent the pumps.

---

A conventional jet pump includes a body with three distinct regions, namely, an outlet or suction section, a throat or a mixing chamber of substantially uniform cross-sectional area throughout its length, and a diffuser which increases in cross-sectional area in the direction of flow. A nozzle is positioned in the inlet section to convert a high-pressure stream of driving fluid into a high-velocity, low-pressure jet of driving fluid which flows coaxially through the inlet section and into the mixing chamber. The high-velocity jet is at a much lower pressure than fluid surrounding the nozzle in the vicinity of the inlet section so driven fluid is sucked into the pump inlet by the jet. A converging housing on the inlet section and surrounding the nozzle directs the driven fluid or suction flow into the mixing chamber. Within the mixing chamber, the high-velocity jet of driving fluid gradually widens as an entrainment-mixing process takes place with the driven fluid or suction stream. The mixing transfers momentum from the jet driving stream to the driven suction stream, so pressure in the combined stream rises. In theory, the mixing chamber ends after a uniform velocity profile is achieved, and this usually occurs shortly after the widening driving jet stream touches the mixing chamber walls. From the relatively small cross-sectional area mixing chamber, the merged driving and driven fluids flow into the diffuser of increasing cross-section in the direction of flow, further increasing pump discharge pressure as the velocity of the merged fluids is reduced to extract the optimum amount of energy from the stream.

Since the jet pump has no mechanical moving parts, it is well suited for forced circulation of coolant, say, water, in a boiling water nuclear reactor where long and trouble-free operation is required because of the high radioactivity, making pump repair or replacement difficult and expensive.

Unfortunately, jet pumps are not inherently efficient, and their efficiency decreases further if there is not accurate alignment of the nozzle and the pump inlet. Since jet pumps in a nuclear reactor normally are assembled under ambient or relatively cool conditions, and then operated at relatively high temperatures and high flow rates, the resulting mechanical and thermal stresses make accurate alignment under operating conditions difficult.

Jet pumps have been used in nuclear reactors before (for example, see U.S. Patents Nos. 2,861,033 and 3,087,881), but their design and arrangement have not been efficient, and have not been conducive to easy maintenance, repair, or replacement.

This invention provides an improved jet pump arrangement which improves pumping efficiency and insures good alignment between the nozzle and pump inlet over a wide range of operating temperatures. Moreover, the arrangement of the pump of this invention is such that the nozzle and pump inlet, which are the elements subject to the most wear, can be easily and quickly removed and replaced, say, during normal refueling, which minimizes shut-down time and radiation hazards to maintenance personnel.

In terms of heat-generating apparatus, the invention includes a nuclear chain reacting core having an inlet end and outlet end through which a fluid coolant such as water flows to be heated. Ordinarily, the core is made up of a bundle of fuel cells with channels for fluid flow through them. A jet pump body has its discharge connected to open into the core inlet. The pump body extends from its discharge end toward the core outlet and terminates at a pump inlet. A nozzle is mounted to direct a jet of driving fluid into the pump inlet. A distributor is connected to the nozzle and spaced from the nozzle in a direction toward the core inlet, and means are provided for delivering fluid to the distributor and nozzle under pressure. Preferably, the driving fluid is picked up at a location spaced from the jet pump inlet and displaced toward the pump outlet so there is a general flow of the fluid toward the pump inlet.

Ordinarily, the nuclear chain reactor core, jet pump body, nozzle, and distributor are mounted in a pressure vessel which holds a supply of water that is converted into steam, extracting heat from the reacting core. The core inlet is usually below the core outlet, and the jet pump body is normally upright. With this arrangement, the diffuser is spaced below the jet pump inlet and nozzle. The pressure vessel can be opened from its top so that the jet pump inlet and nozzle are easily reached for replacement when necessary. Preferably, the nozzle and jet pump inlet are releasably attached to the pump body so that these two elements which are subject to the most wear can be readily reached and replaced. Since the diffuser is located below the jet pump inlet and nozzle, it does not have to be removed in replacing the jet pump nozzle or inlet. Moreover, the diffuser is not subject to excessive wear, and it can be made a permanent part of the pressure vessel internal structure.

Preferably, the distributor is connected by a riser or supply pipe to the nozzle, and the riser is approximately the same effective length as the jet pump body to minimize expansion problems when the reactor is heated and cooled. Preferably, the distributor and jet pump body are attached to the pressure vessel at adjacent locations to minimize thermal expansion problems.

In the presently preferred embodiment of the invention, a plurality of jet pump bodies and respective nozzles are mounted in the pressure vessel in a downcomer annulus formed between the exterior of the core and the interior of the pressure vessel.

A pair of substantially horizontal and semi-annular distributors are mounted in the vessel just below the outlet of each jet pump. A separate riser extends upwardly from the distributors between separate pairs of jet pumps, and each riser carries a fitting at its upper end which directs fluid flow through a 180° turn and into two separate nozzles, each mounted over a respective pump inlet so that two jet pumps are supplied driving fluid by each riser.

Each pair of nozzles is removably secured to the upper end of their respective risers. Each nozzle carries a pair of outwardly extending wings which bear against the upper edge of the inlet of the respective jet pump served by the nozzle. Each jet pump body is made of a material which expands slightly faster with increasing temperature than the material used for the risers. The wings on each nozzle make a close fit on the jet pump inlet with respect to lateral dimensions, but a slightly loose fit in an axial direction, so that when the reactor and water are brought up to operating temperature, the jet pump body expands slightly more than the riser to cause the nozzle wings to make a firm fit on the upper edge of each jet pump inlet and maintain good alignment between the nozzles and the jet pump inlets. In a typical boiling water reactor operated at 1000 p.s.i., the temperature rises from ambient, say, 72° F. to about 550° F.

Preferably, the upper portion of the jet pump body makes a slip fit with the lower portion so the upper portion can be removed and replaced by simply sliding it out of position, thus avoiding having to break or make threaded connections at a considerable distance under water and adjacent a radioactive reactor core.

Preferably, the nozzle fitting connecting a riser to a pair of nozzles has a 180° bend which is divided longitudinally by a curved vane to reduce pressure loss in reversing the direction of fluid flowing from the riser out the nozzle discharge.

These and other aspects of the invention will be more fully understood from the following detailed description and the accompanying drawings, in which:

FIG. 1 is a schematic sectional elevation of a jet pump mounted in a nuclear reactor in accordance with this invention;

FIGS. 2A and 2B are detailed fragmentary sectional elevations, partly broken away, of the major components in the upper and lower portions, respectively, of the reactor shown in FIG. 1;

FIG. 3 is an enlarged view, partly broken away, taken within the area of line 3—3 of FIG. 2B;

FIG. 4 is an enlarged view, partly broken away, taken within the area of line 4—4 of FIG. 2B; and FIG. 5 is a fragmentary view, partly broken away, taken within the area of line 5—5 of FIG. 2B.

Figure 2B:
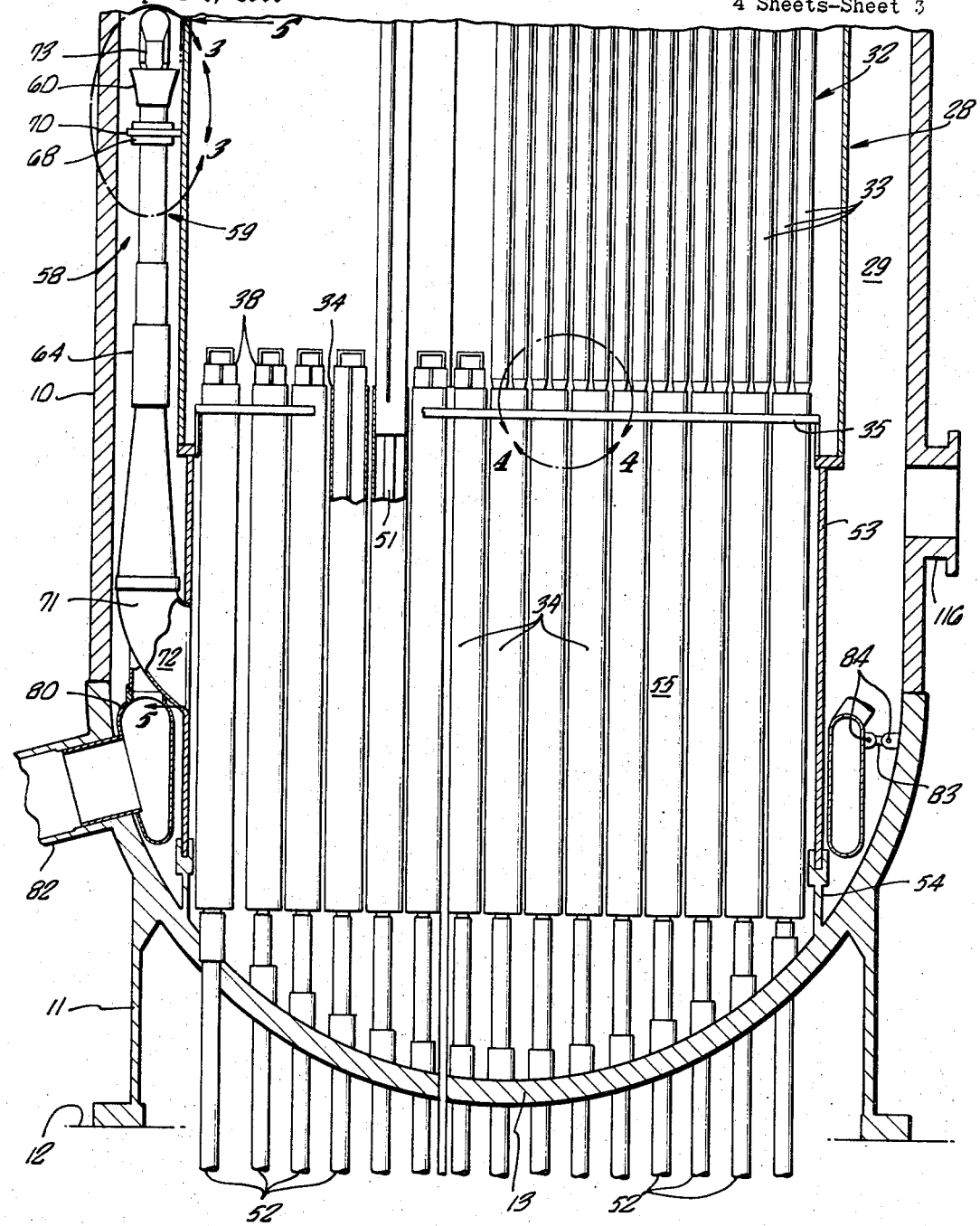

Referring to FIGS. 1, 2A and 2B, an upright cylindrical pressure vessel 10 has downwardly extending feet 11 which rest on a foundation 12. The lower end of the vessel is closed by a dish-shaped bottom head 13, and the upper end of the vessel is closed by a removable dome-shaped top head 14 secured to the upper end of the vessel by nuts 15 and stud bolts 16 attached to outwardly extending respective flanges 17 on the vessel and top head. A vent pipe 18 in the top head is normally closed by a valve 19. The top head is sealed by gaskets 20 to the upper end of the vessel to make a pressure-tight fit. Steam dryer panels 22, which may be of conventional type, are mounted in the upper end of the vessel, and are shown only schematically because they do not form any part of the present invention.

Steam separators 24, which also may be of conventional construction, are mounted in the vessel just below the steam dryer panels, and are shown only schematically because they form no part of the present invention.

Water is maintained in the vessel at a level about midway up the steam separators as indicated by the horizontal dashed line 25.

A separate vapor tube 26 extends down from each steam separator and is sealed through a steam plenum cap 27 of a cylindrical shroud 28 disposed coaxially within the pressure vessel to leave an upright space or downcomer annulus 29 between the shroud and the vessel wall. Feed water is supplied to the tank through four feed water sparger nozzles 30 (only one sparger nozzle is shown) located at equal intervals in a horizontal plane below the normal water level in the tank. A reactor core fuel assembly 32 is made up of a plurality of elongated vertical fuel assemblies 33. The fuel assemblies are arranged in groups of four, with the lower end of each fuel assembly in each group resting on a vertical respective control rod guide tube 34 sealed at its upper end through a horizontal bottom grid plate 35 mounted across the bottom of the shroud. Each guide tube 34 extends down below the bottom grid plate, and a separate control rod 38 is mounted in each control rod guide tube to slide longitudinally up and down between the four adjacent elongated vertical fuel assemblies 33 resting on the guide tube. Vertical flow channels 42 (see FIG. 4) extend through each vertical fuel assembly and open out the lower and upper end of each fuel assembly. The lower end of each fuel channel is sealed in a respective water inlet opening 44 in a guide tube casting 45 so that water can flow upwardly through the fuel assemblies where water changes to steam, and then pass as a steam-water mixture out the vapor tubes and through the steam separators.

Water separated from the steam in the separators is returned to the downcomer annulus. Steam passes the steam dryer panels, and leaves the vessel through a steam outlet 46 to pass through a conventional steam turbine 47 (FIG. 1) and condenser 48. The turbine drives an electric generator 49 to develop power from the heat generated in the reactor. Condensed steam is returned from the condenser to the feed water sparger nozzles by a conventional pump 50.

The control rods are moved into and out of the reactor core region by control rod drive pistons 51 which each extend through a respective vertical control rod drive thimble 52 sealed through the bottom of the vessel. The control rod drive pistons are operated by conventional equipment which is not shown since it forms no part of this invention.

The lower end of the shroud is welded to the upper end of a cylindrical shroud support skirt 53, the lower end of which is welded to an annular ring 54 formed integrally with the bottom head of the vessel. A core inlet plenum chamber 55 is formed within the shroud support skirt 53 and between the bottom grid plate 34 and the bottom head 13 of the vessel.

A plurality of upright jet pumps 58 are mounted in the downcomer annulus between the shroud and the vessel. The jet pumps are identical so only one is described in detail. Each jet pump includes an elongated vertical hollow body 59 which includes an inlet or suction entrance 60 at its upper end. As shown in FIGS. 1, 2B, 3 and 5, the suction entrance converges downwardly into a straight cylindrical throat or mixing chamber 62, which merges at its lower end into an outwardly diverging diffuser 63. The suction entrance, throat, and upper portion of the diffuser are welded together to form an integral unit. The lower end of this unit makes a slip fit into a circular fitting 64 secured to the upper part of the lower portion of the diffuser. The upper end 65 of the fitting 64 tapers outwardly to facilitate inserting the lower end of the slip joint into it.

An O-ring 66, which may be optional, makes a seal between the lower end of the upper portion of the diffuser and an inwardly extending annular shoulder 67 in the intermediate part of the fitting 64.

Referring to FIGS. 2B and 3, a horizontal external spacer ring 68 is welded to the upper portion of the throat and makes a slip fit in a vertical opening 69 in an outwardly extending annular shelf 70 welded to the exterior of the shroud. Thus, the suction entrance, throat, and upper part of the diffuser of each pump can be removed by simply lifting this assembly of elements from the fitting 64. A new assembly of those parts is easily fitted into place by guiding it down through its respective opening in the shelf.

The lower end of the diffuser fits into a turning elbow connection 71 which is welded to an inlet opening 72 in the shroud skirt, so that water discharged from the pump is forced through the skirt, into the core inlet plenum chamber, past the control rod guide tubes, and up the channels in the fuel assemblies.

A separate jet pump nozzle 73 is secured at the suction entrance of each jet pump to direct a jet of high-velocity driving fluid or water into the suction inlet. The internal diameter of the nozzle is reduced at 74 so that the water velocity increases with a corresponding decrease in pressure. This reduction in pressure causes driven fluid or water to be sucked from the downcomer annulus into the suction entrance of the pump where it is mixed with the high-velocity jet in the throat or mixing section. The driving and driven fluids are substantially completely mixed by the time they reach the upper end of the diffuser, and they begin to reduce in speed and increase in pressure as they move out the diffuser and into the shroud skirt.

Preferably, the jet pump nozzles are formed in pairs, shown best in FIG. 5. Each nozzle in a pair extends outwardly and downwardly from a special casting 76 which makes a fluid-tight fit on the upper end of a vertical riser or supply pipe 78 welded at its lower end to the upper side of a hollow arcuate distributor or manifold 80. Although only one distributor is shown in the drawings, the pump risers are preferably served by a pair of hollow arcuate distribution manifolds identical in size and shape. Each manifold extends through an arc of about 150° and is supplied water under pressure from a separate conventional recirculation pump 81 through an inlet 82.

As shown best in FIG. 2B, the distributor manifold is secured to the vessel at inlet 82 closely adjacent the location where the shroud skirt is secured to the vessel. This results in the risers and jet pump bodies, which are secured to the shroud skirt, being substantially the same effective length to minimize the problems of thermal expansion and contraction as the equipment is heated and cooled. Each distributor is supported along its length by thermal expansion and vibration damper horizontal links 83 secured at their opposite ends by pivot pins 84 to the distributors and the interior of the tank.

Returning to the nozzles, the special casting to which they are secured includes a circular elbow dome 85 which overlies a circular neck 86 that has an inwardly stepped annular shoulder 87 that makes a snug pressure-tight fit with an outwardly stepped annular shoulder 88 on the upper end of the riser. Two separate U-shaped flow channels 90 extend in opposite directions from the neck 86 and each terminates at a respective nozzle. Each flow channel 90 is divided longitudinally by a U-shaped vane 92 concentrically disposed in a respective flow channel and formed integrally with the casting 76 to reduce pressure loss in the liquid changing direction 180° in passing from the riser into the nozzle.

The casting 76 is held in the position shown in FIG. 2 by a vertical inverted bolt 94 with a T-head 96 on its lower end and making a lock fit in a lower horizontal recess 98 in a transverse web 100 formed integrally across the upper end of the riser.

An upper or entrance horizontal recess 102 in the web and located above and extending transversely to the lower recess 98 permits the T-head 96 of the bolt 94 to be located in the lower recess 98 and turned to the locked-down position shown in FIG. 2B to be prevented from withdrawal. A nut 104 is threaded down on the bolt 94 against the upper end of a downwardly opening retainer cup 106 which confines a compression spring 108 against the top of the special casting 76. The spring prevents the nut 104 from vibrating loose. A retainer ring 110 on the bolt above the nut prevents the nut from being removed completely from the bolt. The upper end of the bolt is tapered and provided with a slot 112 to receive a tool (not shown) which permits the bolt shank 94 to be turned by remote control and release the head 96 from the recess 98 when the castings and nozzles are to be removed and replaced.

Each nozzle has three downwardly and outwardly extending wings 114, spaced at 120° intervals, with downwardly opening notches 115 at their lower ends to make a snug fit around the suction inlet of the pump, and to make a slightly loose fit at room temperature in an axial direction against the upper edge of the suction inlet when the special casting is bolted tightly against the upper end of the riser.

The pump body is made of a material, say, stainless steel, which has a slightly greater thermal coefficient of expansion than the riser, which is made of a material such as Inconel. The pumps are assembled at room temperature, and when they are heated to their normal operating temperatures, their bodies expand longitudinally slightly more than do the risers, causing the suction entrance of each pump to make a tight fit into the notches of the wings on the nozzles. This insures accurate alignment of the nozzles under all operating conditions so that the pump efficiency does not decrease due to vibration or thermal cycling. The use of materials of different thermal coefficients of expansion for the pump bodies and risers to minimize thermal expansion problems is more specifically described and claimed in a copending patent application, entitled "Pumping," Ser. No. 445,383, filed on even date herewith by Donald E. Hughes.

Water is supplied from the downcomer annulus to each of the recirculation pumps through a respective outlet 116 located below the pump nozzles and just above the distribution manifolds. Only one recirculating pump outlet is shown, although two are usually used, there being one for each recirculation pump which, in turn, supplies water to a respective distributor manifold.

About one-third of the water flowing through the reactor core is circulated exterior of the vessel through the recirculation pumps and back to the nozzles of the jet pumps. The remaining two-thirds of the water passing through the core is forced through jet pumps without having to leave the pressure vessel. This improves heat economy and involves fewer hazards than when all of the water forced to circulate through the core is taken outside the vessel through a circulation pump and then returned.

The location of the pump recirculation outlets below the jet pump nozzles creates a general downward flow in the downcomer annulus and improves the operating efficiency of the jet pumps. Moreover, the location of the distributors below the recirculation outlets places them out of the flow of fluid and further improves pumping efficiency.

In operation, the recirculating pumps are turned on to activate the jet pumps which drive water into the shroud skirt and up through the reactor core which, in effect, has a channel with an inlet at its lower end and an outlet at its upper end for the flow of fluid coolant through it. The control rods are set to provide the required fission rate in the reactor core, and water passing through the reactor core is vaporized to a mixture of steam and water, which is separated at the steam separators. Water is returned to the downcomer annulus. Steam passes the drying panels for power use and is then condensed and returned to the downcomer annulus.

The water passing through the reactor core flows down past the jet pump nozzles and out the recirculation pump outlet to the recirculation pump, where it is increased in pressure and returned to the distribution manifolds. Water under high pressure flows through the risers and jets as a driving stream from the nozzles into the suction entrances of the jet pumps. Water is drawn into the entrance of the jet pumps as driven fluid and forced under pressure into the shroud skirt and up through the reactor core.

The operation is continued until the pumps need maintenance. For example, the flow rate of liquid through the nozzles and throat sections of the pumps is relatively high, so that these sections tend to wear first, and they are easily replaced when the reactor is refueled.

With the design of this invention, it is a fairly simple matter to replace the nozzles and throats remotely, easily, and safely. The reaction of the reactor core is reduced below critical, and pressure is vented from the vessel. The top head of the vessel is removed, and a suitable tool (not shown) is lowered in the water to loosen the nut 104 on each of the jet pump nozzle castings. When the nuts are sufficiently loosened, a special tool is inserted into slot 112 of the bolt shank 94 and rotated to free the bolt from the recess 98 in the web of the riser tube. The casting and each pair of nozzles attached to it are now free to be lifted from the riser. The upper portion of each pump requiring replacement is lifted by a suitable retrieving tool (not shown) to slip the upper portion of the diffuser out of its slip joint so that the suction entrance, throat, and upper portion of the diffuser of a pump can be replaced by reversing the above described procedure. After the necessary replacements are made, the equipment is operated as previously described.

The advantages of the pump and assembly of this invention are:

(1) A relatively large distributor manifold can be used without interfering with the flow of fluid within the vessel, without interfering with the replacement of jet pump parts, and without having to be removed for such replacement. In fact, the distributor manifold can be made a permanent part of the vessel.

(2) Only two inlet and outlet penetrations in the pressure vessel are required for the forced circulation of water, and this number can be reduced if desired by using only one distributor instead of two.

(3) The jet nozzles and upper portions of the jet pump bodies are readily replaceable.

(4) The nozzles are supported off the jet pump section entrance of each pump to assure accurate alignment whether hot or cold.

(5) The downcomer annulus above the nozzles and pumps is unobstructed, which not only facilitates repair and replacement, but provides for virtually unlimited expansion space upwardly for installation of improved pumps as they become available.

(6) Thermal expansion problems are minimized by reducing to a minimum the distance between the point where the core shroud and the distributor manifold are attached to the vessel.

(7) The location of the jet pump inlet is relatively high with respect to the reactor core and provides an additional safety factor in the event of external water line rupture. A break in the water line supplying driving fluid to the jet pump nozzles would result in a reverse flow of water due to the reactor vessel pressure, thereby forcing water from the vessel out through the broken driving fluid line to partially unflood the vessel. However, the water level in the pressure vessel could drop only to the level of the jet pump inlet, thereby keeping the reactor core largely or completely covered with water. Thereafter, the vessel would depressurize by discharging steam through the broken inlet water line. The remaining water inside the vessel would flash into steam, which would flow out through the ruptured line.

Similarly, a rupture of the driving fluid suction line, that is, the line between the vessel outlet and inlet of the driving fluid recirculation pump would rapidly drain the water contained in the downcomer annulus between the pressure vessel wall and the core shroud, as well as the water within the shroud down to a level to the jet pump inlets. All or most of the core would remain covered with water until flashed away as steam.

The above action would not be possible if the jet pump inlets were located at a relatively low point with respect to the core, because rupture of either type just described would unflood the core completely. The arrangement of this invention therefore results in keeping the core substantially flooded with water to dissipate residual heat of various kinds generated by the core even after an emergency shutdown, and provides cooling until emergency cooling facilities (not shown) can be activated and core sprays brought into action.

I claim:

1. Heat generating reactor apparatus comprising a pressure vessel adapted to hold a body of fluid coolant, a nuclear chain reacting core within the vessel and having an inlet and an outlet through which the fluid coolant flows to be heated, a jet pump body having a discharge opening into the core inlet, the pump body extending toward the core outlet and terminating at a jet pump inlet, a nozzle mounted to direct a jet of driving fluid into the jet pump inlet, a distributor spaced from the nozzle in a direction toward the core inlet, a supply riser connected between the distributor and the nozzle, and means for delivering fluid to the distributor and nozzle under pressure.

2. Heat generating reactor apparatus comprising a nuclear chain reacting core having an inlet and an outlet through which a fluid coolant flows to be heated, a jet pump body having a discharge opening into the core inlet, the pump body extending toward the core outlet and terminating at a pump inlet, a nozzle mounted to direct a jet of driving fluid into the pump inlet, a distributor spaced from the nozzle in a direction toward the core inlet, a supply riser connected to the distributor and nozzle, the supply riser and jet pump body being about the same length, and means for delivering fluid to the distributor and nozzle under pressure.

3. Heat generating reactor apparatus comprising a nuclear chain reacting core having an inlet and an outlet through which a fluid coolant flows to be heated, a plurality of jet pump bodies disposed in a row and each body having a discharge opening into the core inlet, the pump body extending toward the core outlet and terminating at a jet pump inlet, a separate nozzle mounted to direct a jet of driving fluid into a respective jet pump inlet, an elongated distributor spaced from the nozzles in a direction toward the core inlet, a plurality of supply risers connected to the distributor, each riser extending between a respective pair of pump bodies and being connected to the nozzles directing jets of driving fluid into the inlet of the said pair of pump bodies, and means for delivering fluid to the distributor and nozzle under pressure.

4. Heat generating reactor apparatus comprising a nuclear chain reacting core having an inlet and an outlet through which a fluid coolant flows to be heated, a jet pump body having a discharge opening into the core inlet, the pump body extending toward the core outlet and terminating at a jet pump inlet, a nozzle mounted to direct a jet of driving fluid into the jet pump inlet, a distributor spaced from the nozzle in a direction toward the core inlet, an elongated supply riser connected at one end to the distributor and at its other end to the nozzle, the supply riser making about a 180° bend before reaching the nozzle, and a curved vane disposed in the 180° bend to reduce head loss in the distributor, and means for delivering fluid to the distributor, supply riser, and nozzle under pressure.

5. Heat generating reactor apparatus comprising a nuclear chain reacting core having an inlet and an outlet through which a fluid coolant flows to be heated, a jet pump body having a discharge opening into the core inlet, the pump body extending toward the core outlet and terminating at a jet pump inlet, a nozzle disposed to direct a jet of driving fluid into the pump inlet, a distributor spaced from the nozzle in a direction toward the core inlet, a supply riser extending from the distributor to the nozzle, and means for removably securing the nozzle to the supply riser, and means for delivering fluid to the distributor, supply riser, and nozzle under pressure.

6. Heat generating reactor apparatus comprising a nuclear chain reacting core having a plurality of fluid channels each with an inlet and an outlet through which a fluid coolant flows to be heated, a plenum chamber around the inlets of the fuel channels, a plurality of jet pump bodies each having a discharge opening into the plenum chamber around the fuel channel inlet, each pump body extending toward the fuel channel outlet and terminating at a pump inlet, a separate nozzle mounted to direct a jet of driving fluid into the inlet of a respective pump, a distributor connected to the nozzles, and means for delivering fluid to the distributor and nozzle under pressure.

7. Heat generating apparatus comprising a pressure vessel adapted to hold a pool of fluid coolant, a nuclear chain reacting core disposed in the vessel to leave an upright space between the core and the vessel, the core having an inlet and an outlet through which the fluid coolant can flow to be heated, a jet pump body disposed in the space between the core and the vessel, the pump body having a discharge and an upwardly opening inlet, means connecting the pump discharge to the core inlet, a jet nozzle mounted in the vessel to direct a stream of driving fluid into the pump inlet, a distributor mounted in the space between the core and the vessel and below the pump inlet, means defining a driving fluid outlet in the vessel between the pump inlet and the distributor, means for pumping fluid from the driving fluid outlet to the distributor, and means for supplying fluid under pressure from the distributor to the nozzle to drive fluid in the vessel through the core.

References Cited

UNITED STATES PATENTS

| | | | |
|---|---|---|---|
| 2,861,033 | 11/1958 | Treshow | 176—75 X |
| 3,087,881 | 4/1963 | Treshow | 176—61 |
| 3,202,584 | 8/1965 | Bogaardt et al. | 176—61 |
| 3,231,471 | 1/1966 | Jones et al. | 176—61 |
| 3,274,065 | 9/1966 | Kierulf et al. | 176—61 |

FOREIGN PATENTS

| | | |
|---|---|---|
| 1,124,527 | 3/1962 | Germany. |
| 643,116 | 9/1950 | Great Britain. |

OTHER REFERENCES

Hicks, T. G.: Pump Selection and Application, McGraw-Hill Book Co., New York, 1957, pp. 340, 341.

REUBEN EPSTEIN, *Primary Examiner.*